United States Patent
Chen et al.

(10) Patent No.: US 9,420,576 B2
(45) Date of Patent: Aug. 16, 2016

(54) PDSCH TRANSMISSION SCHEMES WITH COMPACT DOWNLINK CONTROL INFORMATION (DCI) FORMAT IN NEW CARRIER TYPE (NCT) IN LTE

(71) Applicant: QUALCOMM Incorporated, San Diego, CA (US)

(72) Inventors: Wanshi Chen, San Diego, CA (US); Peter Gaal, San Diego, CA (US); Tao Luo, San Diego, CA (US); Hao Xu, San Diego, CA (US); Aleksandar Damnjanovic, Del Mar, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 51 days.

(21) Appl. No.: 14/257,872

(22) Filed: Apr. 21, 2014

(65) Prior Publication Data
US 2014/0314007 A1 Oct. 23, 2014

Related U.S. Application Data

(60) Provisional application No. 61/815,084, filed on Apr. 23, 2013.

(51) Int. Cl.
| | |
|---|---|
| H04W 72/04 | (2009.01) |
| H04B 7/04 | (2006.01) |
| H04B 7/06 | (2006.01) |
| H04B 7/00 | (2006.01) |
| H04L 5/00 | (2006.01) |

(52) U.S. Cl.
CPC .............. *H04W 72/042* (2013.01); *H04B 7/00* (2013.01); *H04B 7/0452* (2013.01); *H04B 7/0617* (2013.01); *H04B 7/0619* (2013.01); *H04B 7/0689* (2013.01); *H04L 5/0053* (2013.01); *H04L 5/0007* (2013.01)

(58) Field of Classification Search
CPC ..................................................... H04W 72/042
USPC ......................................................... 370/329
See application file for complete search history.

(56) References Cited

U.S. PATENT DOCUMENTS

| | | | | |
|---|---|---|---|---|
| 8,380,135 | B2 * | 2/2013 | Ko et al. ......................... | 455/68 |
| 2010/0238824 | A1 * | 9/2010 | Farajidana ........... | H04B 7/0417 370/252 |
| 2011/0255483 | A1 * | 10/2011 | Xu ...................... | H04L 25/0232 370/329 |
| 2011/0280333 | A1 * | 11/2011 | Yang ...................... | H04L 5/003 375/295 |
| 2012/0201187 | A1 * | 8/2012 | Koo ...................... | H04L 1/0027 370/312 |
| 2012/0250642 | A1 * | 10/2012 | Qu et al. ......................... | 370/329 |
| 2012/0322492 | A1 * | 12/2012 | Koo et al. ...................... | 455/517 |
| 2013/0021991 | A1 * | 1/2013 | Ko et al. ......................... | 370/329 |
| 2013/0163543 | A1 * | 6/2013 | Freda et al. .................... | 370/329 |
| 2013/0242947 | A1 * | 9/2013 | Chen ...................... | H04W 72/04 370/335 |

OTHER PUBLICATIONS

Hossain E., et al., "Cooperative communications in 3GPP LTE-Advanced standard", In: "Cooperative Cellular Networks", XP055130357, ISBN: 978-0-52-176712-5, Mar. 10, 2011, pp. 438-443.

(Continued)

*Primary Examiner* — Rasheed Gidado
(74) *Attorney, Agent, or Firm* — Patterson & Sheridan, L.L.P.

(57) ABSTRACT

Certain aspects of the present disclosure relate to physical downlink shared channel (PDSCH) transmission schemes with compact downlink control information (DCI) format in new carrier type (NCT) in long term evolution (LTE).

28 Claims, 9 Drawing Sheets

(56) References Cited

OTHER PUBLICATIONS

Huawei., et al., "Evolution of transmission mode 10 for NCT", 3GPP Draft; R1-130879, 3rd Generation Partnership Project (3GPP), Mobile Competence Centre; 650, Route Des Lucioles; F-06921 Sophia-Antipolis Cedex; France, vol. RAN WG1, no. Chicago, USA; XP050696881, http://www.3gpp.org/ftp/tsg_ran/WG1_RL1/TSGR1_72b/Docs/, 20130415-20130419 Apr. 6, 2013, 1-3 pages.

International Search Report and Written Opinion—PCT/US2014/034894—ISA/EPO—Jul. 25, 2014.
Research in Motion., et al., "Other design aspects of standalone NCT", 3GPP Draft; R1-131349 (RIM—Other Design Aspect for NCT), 3rd Generation Partnership (3GPP), Mobile Competence Centre; 650, Route Des Lucioles; F-06921 Sophia-Antipolis Cedex; France, vol. RAN WG1. no. Chicago. USA; XP050697204, URL:http://www.3gpp.org/ftp/tsg_ran/WG1_RL1/TSGR1_72b/Docs/, 20130415-20130419 Apr. 6, 2013, 3 pages.

* cited by examiner

| Field | 6 Bit-width | 15 Bit-width | 25 Bit-width | 50 Bit-width | 75 Bit-width | 100 Bit-width | Notes |
|---|---|---|---|---|---|---|---|
| Carrier Indicator | 0 | 0 | 0 | 0 | 0 | 0 | If cross-carrier scheduling is enabled, 3 bits; otherwise, 0 |
| Flag format0/format1A differentiation | 1 | 1 | 1 | 1 | 1 | 1 | For CRC scrambled by RA-RNTI, P-RNTI, or SI-RNTI, the flag shall be interpreted to indicate column of the TBS table. Otherwise, it is used to differentiate format 0 and format 1A. |
| Localized/Distributed VRB assignment flag | 1 | 1 | 1 | 1 | 1 | 1 | |
| Resource allocation | 5 | 7 | 9 | 11 | 12 | 13 | Starting VRB and number of consecutive VRBs |
| MCS | 5 | 5 | 5 | 5 | 5 | 5 | 32 levels of MCS (compute TBS from RB assignement). |
| HARQ process id | 3 | 3 | 3 | 3 | 3 | 3 | HARQ process ID (3b for FDD, 4b for TDD) |
| New data indicator | 1 | 1 | 1 | 1 | 1 | 1 | For CRC scrambled by RA-RNTI, P-RNTI, or SI-RNTI, the flag shall be interpreted to indicate the gap value. |
| Redundancy version | 2 | 2 | 2 | 2 | 2 | 2 | |
| TPC | 2 | 2 | 2 | 2 | 2 | 2 | TPC command for PUCCH |
| Downlink Assignment Index | 0 | 0 | 0 | 0 | 0 | 0 | 0b for FDD, 2b for TDD |
| SRS Request | 0 | 0 | 0 | 0 | 0 | 0 | If configured by higher layers (configuration is bundled with DCI format 0), only in UE-specific search space |
| HARQ-ACK resource offset | 2 | 2 | 2 | 2 | 2 | 2 | To indicate an offset for UL ACK/NAK resource derivation |
| [Beamforming indicator] | 1 | 1 | 1 | 1 | 1 | 1 | 0: Open loop BF; 1: closed loop BF |
| Antenna port indication | 1 | 1 | 1 | 1 | 1 | 1 | For CLBF, 0: antenna port 7, 1: antenna port 8. For OLBF, set to 0 |
| Zero-padding | 0 | 0 | 0 | 0 | 0 | 0 | If the number of information bits in format 1A mapped onto a given search space is less than that of format 0 for scheduling the same serving cell and mapped onto the same search space, zeros shall be appended to format 1A until the payload size equals that of format 0. |
| CRC | 16 | 16 | 16 | 16 | 16 | 16 | CRC masked by UE MAC ID |
| Total: | 40 | 42 | 44 | 46 | 47 | 48 | |

| EPDCCH Mode | EPDCCH Port for DCI format 1A' | PDSCH Port | PDSCH Mode |
|---|---|---|---|
| Localized | 107 or 109 | 7 | CLBF |
| | 108 or 110 | 8 | CLBF |
| Distributed | 107 or 109 | 7 & 8 | OLBF |

*FIG. 8*

PDSCH TRANSMISSION SCHEMES WITH COMPACT DOWNLINK CONTROL INFORMATION (DCI) FORMAT IN NEW CARRIER TYPE (NCT) IN LTE

CROSS-REFERENCE TO RELATED APPLICATIONS

The present application for patent claims priority to U.S. Provisional Application No. 61/815,084, filed Apr. 23, 2013, which is assigned to the assignee of the present application and hereby expressly incorporated by reference herein in its entirety.

FIELD

Aspects of the present disclosure relate generally to wireless communication systems, and more particularly, to scheduling physical downlink shared channel (PDSCH) transmissions with downlink control information (DCI) format.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communications by a base station. The method generally includes generating Downlink Control Information (DCI) for scheduling a physical downlink shared channel (PDSCH) to at least one user equipment (UE) according to a first DCI format, providing an indication of one or more parameters for a type of beamforming on which the scheduled PDSCH is based, and transmitting the DCI to the UE in a physical downlink control channel (PDCCH).

Certain aspects of the present disclosure provide a method for wireless communications by a user equipment (UE). The method generally includes receiving a downlink control channel with Downlink Control Information (DCI) of a first DCI format for scheduling a physical downlink shared channel (PDSCH), determining one or more parameters for a type of beamforming on which the PDSCH is based, and processing the PDSCH based on the DCI and the one or more beamforming parameters.

Certain aspects of the present disclosure provide an apparatus for wireless communications by a base station. The apparatus generally includes means for generating Downlink Control Information (DCI) for scheduling a physical downlink shared channel (PDSCH) to at least one user equipment (UE) according to a first DCI format, means for providing an indication of one or more parameters for a type of beamforming on which the scheduled PDSCH is based, and means for transmitting the DCI to the UE in a downlink control channel.

Certain aspects of the present disclosure provide an apparatus for wireless communications by a user equipment (UE). The apparatus generally includes means for receiving a downlink control channel with Downlink Control Information (DCI) of a first DCI format for scheduling a physical downlink shared channel (PDSCH), means for determining one or more parameters for a type of beamforming on which the PDSCH is based, and means for processing the PDSCH based on the DCI and the one or more beamforming parameters.

Certain aspects of the present disclosure provide an apparatus for wireless communications by a base station. The apparatus generally includes at least one processor configured to generate Downlink Control Information (DCI) for scheduling a physical downlink shared channel (PDSCH) to at least one user equipment (UE) according to a first DCI format, provide an indication of one or more parameters for a type of beamforming on which the scheduled PDSCH is based, and transmit the DCI to the UE in a downlink control channel; and a memory coupled with the at least one processor.

Certain aspects of the present disclosure provide an apparatus for wireless communications by a user equipment (UE). The apparatus generally includes at least one processor configured to receive a downlink control channel with Downlink Control Information (DCI) of a first DCI format for scheduling a physical downlink shared channel (PDSCH), determine one or more parameters for a type of beamforming on which the PDSCH is based, and process the PDSCH based on the DCI and the one or more beamforming parameters; and a memory coupled with the at least one processor.

Certain aspects of the present disclosure provide a program product for wireless communications by a base station, comprising a computer readable medium having instructions stored thereon. The instructions are generally for generating Downlink Control Information (DCI) for scheduling a physical downlink shared channel (PDSCH) to at least one user equipment (UE) according to a first DCI format, providing an indication of one or more parameters for a type of beamforming on which the scheduled PDSCH is based, and transmitting the DCI to the UE in a downlink control channel.

Certain aspects of the present disclosure provide a program product for wireless communications by a user equipment (UE), comprising a computer readable medium having instructions stored thereon. The instructions are generally for receiving a downlink control channel with Downlink Control Information (DCI) of a first DCI format for scheduling a physical downlink shared channel (PDSCH), determining one or more parameters for a type of beamforming on which the PDSCH is based, and processing the PDSCH based on the DCI and the one or more beamforming parameters.

BRIEF DESCRIPTION OF THE DRAWINGS

FIG. 7 illustrates an example DCI format, in accordance with certain aspects of the disclosure.

FIG. 8 illustrates an exemplary mapping of EPDCCH transmission parameters to PDSCH transmission parameters, in accordance with certain aspects of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband CDMA (W-CDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
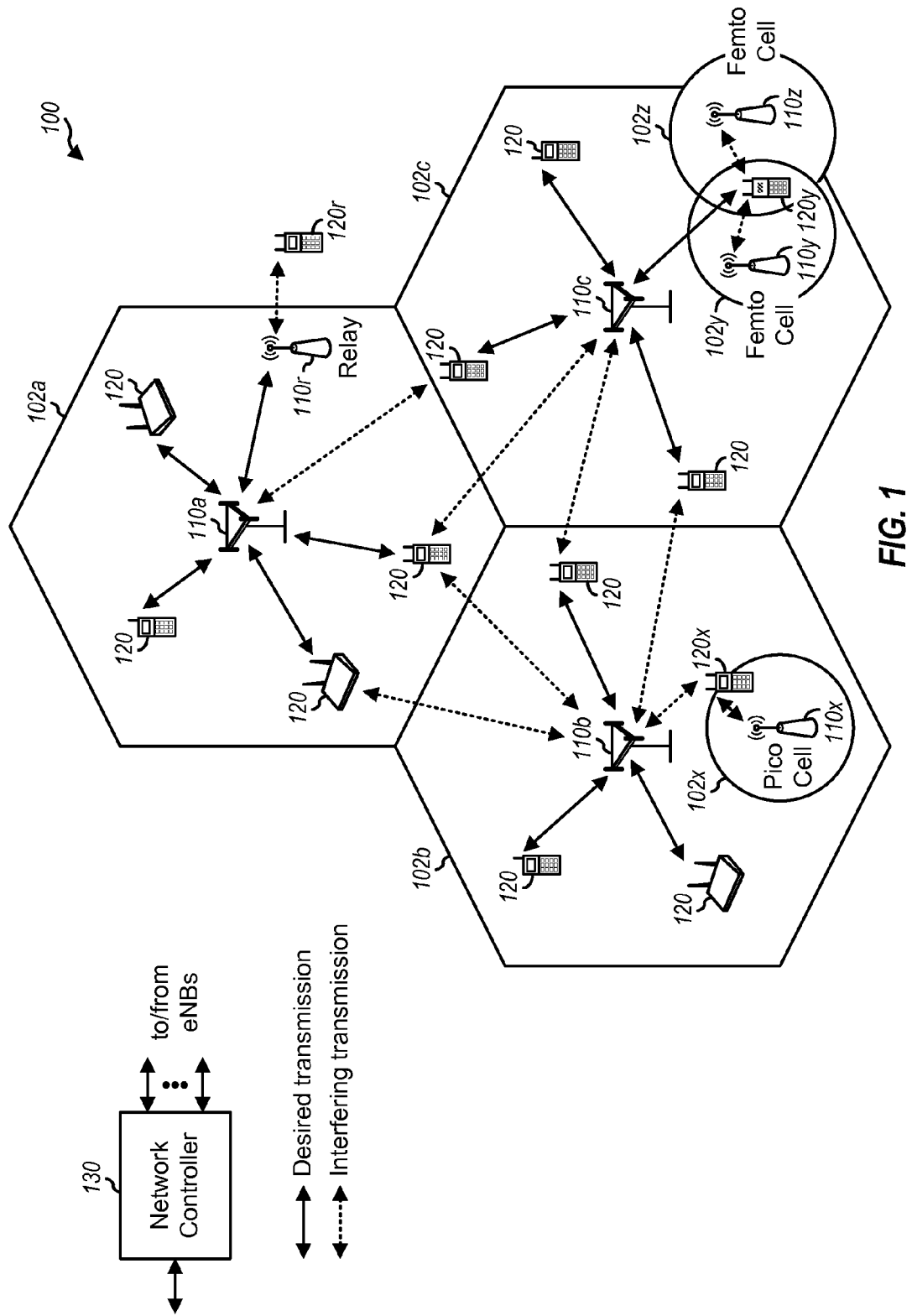
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network (HetNet) that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size used in generating signals for transmission and decoding received signals may be equal to 128, 256, 512, 1024 or 2048 for system bandwidths of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidths of 1.25, 2.5, 5, 10 or 20 MHz, respectively.

Figure 2:
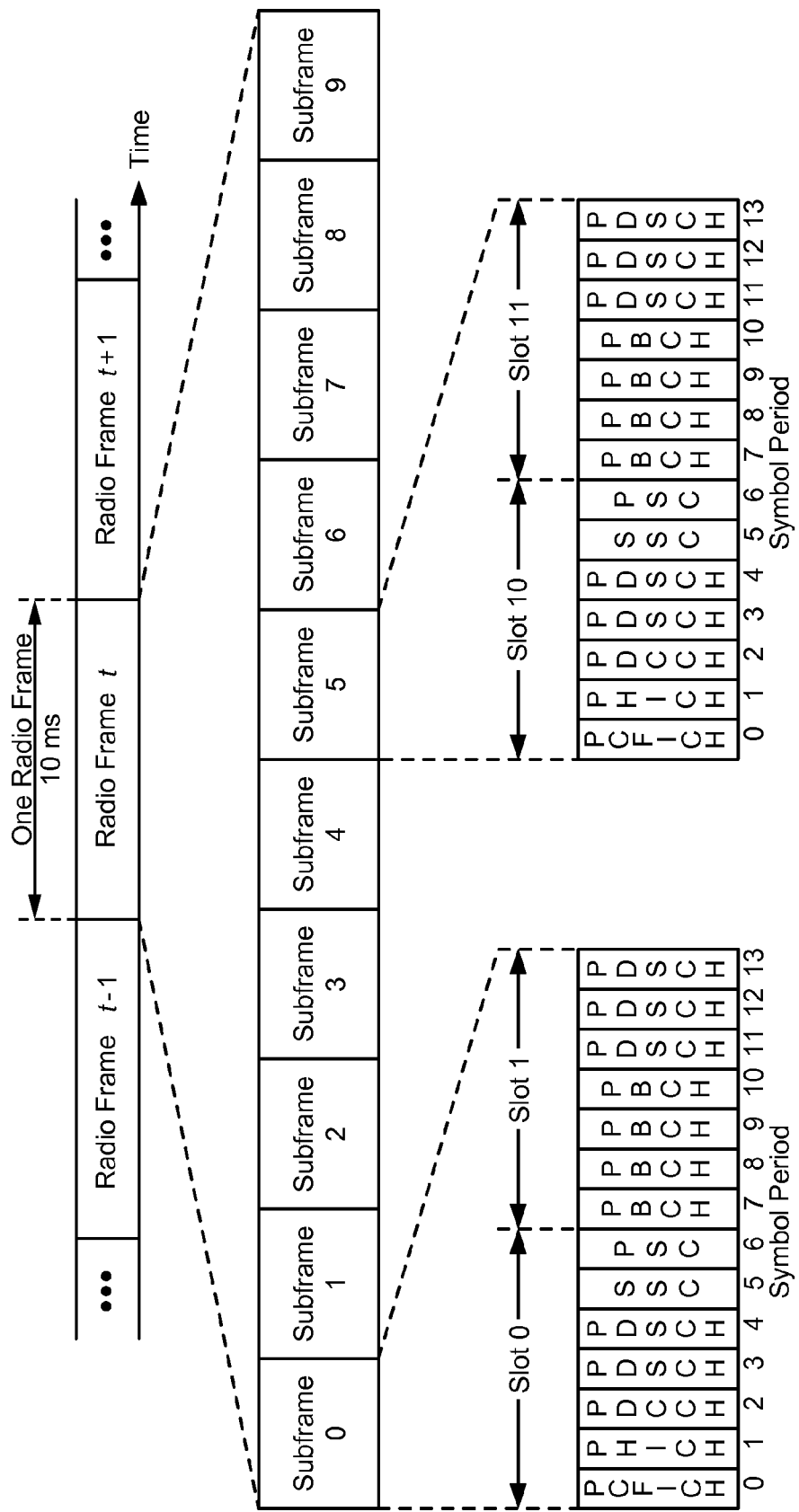
FIG. 2 is a block diagram conceptually illustrating an example of a down link frame structure in a telecommunications system.

FIG. 2 shows a downlink frame structure used in LTE. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) on the downlink in the center 1.08 MHz of the system bandwidth for each cell served by the eNodeB. The PSS and SSS may be transmitted in symbol periods 6 and 5, respectively, in sub-frames 0 and 5 of each radio frame with the normal cyclic prefix, as shown in FIG. 2. The synchronization signals may be used by UEs for cell detection and acquisition. During cell search and acquisition, the terminal detects the cell frame timing and the reference-signal sequence, from which the terminal learns the physical-layer identity of the cell (given by the reference-signal sequence). The eNodeB may also transmit a Physical Broadcast Channel (PBCH) in symbol periods 0 to 3 in slot 1 of certain radio frames. The PBCH may carry some system information. The eNodeB may transmit other system information such as System Information Blocks (SIBs) on a Physical Downlink Shared Channel (PDSCH) in certain subframes. The eNodeB may transmit control information/data on a Physical Downlink Control Channel (PD-CCH) in the first B symbol periods of a subframe, where B may be configurable for each subframe. The eNodeB may transmit traffic data and/or other data on a PDSCH in the remaining symbol periods of each subframe.

The eNodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission request (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
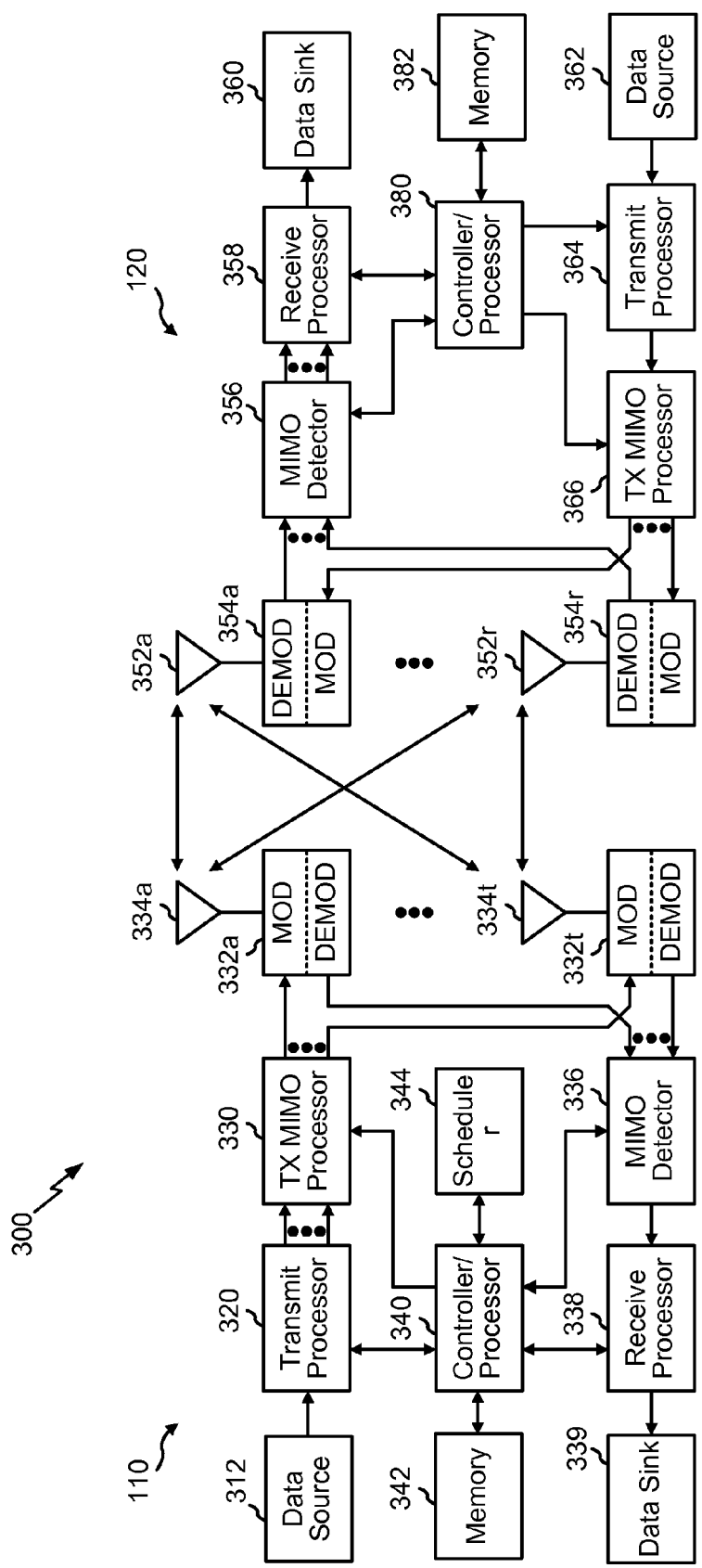
FIG. 3 is a block diagram conceptually illustrating a design of a base station/eNodeB and a UE in accordance with certain aspects of the disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct, e.g., the execution of various processes for the techniques described herein. The processor 380 and/or other processors and modules at the UE 120 may also perform or direct, e.g., the execution of the functional blocks illustrated in FIG. 7, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the base station 110 includes means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the controller/processor 340, the memory 342, the transmit processor 320, the modulators 332, and the antennas 334 configured to perform the functions recited by the aforementioned means. In another aspect, the aforementioned means may be a module or any apparatus configured to perform the functions recited by the aforementioned means. In one configuration, the UE 120 includes means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the controller/processor 380, the memory 382, the receive processor 358, the MIMO detector 356, the demodulators 354, and the antennas 352 configured to perform the functions recited by the aforementioned means. In another aspect, the aforementioned means may be a module or any apparatus configured to perform the functions recited by the aforementioned means.

Carrier Aggregation

LTE-Advanced UEs may use spectrum of up to 20 MHz bandwidths allocated in a carrier aggregation of up to a total of 100 MHz (5 component carriers) used for transmission in each direction. For the LTE-Advanced mobile systems, two types of carrier aggregation (CA) methods have been proposed, continuous CA and non-continuous CA. Both non-continuous and continuous CA aggregate multiple LTE/component carriers to serve a single unit of LTE Advanced UE. According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). CA can improve overall transmission efficiency, in that only resources on the primary carrier are used for control functions, while all of the secondary carriers are available for data transmission. Thus, the ratio of transmitted data to control functions may be increased by CA, when compared to non-CA techniques.

Figure 4:
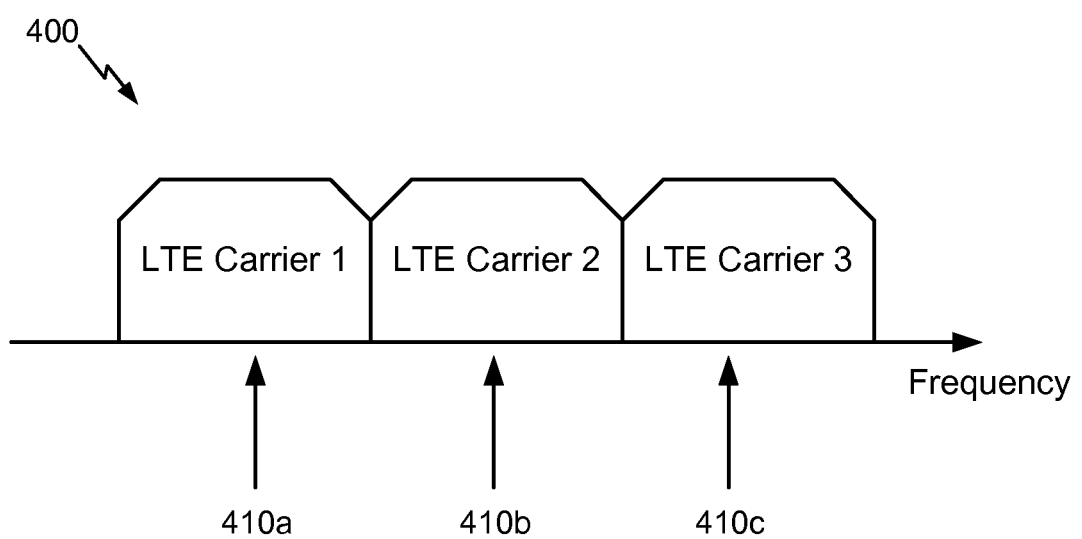
FIG. 4 illustrates continuous carrier aggregation, in accordance with certain aspects of the disclosure.

FIG. 4 illustrates continuous CA 400, in which multiple available component carriers 410 adjacent to teach other are aggregated.

Figure 5:
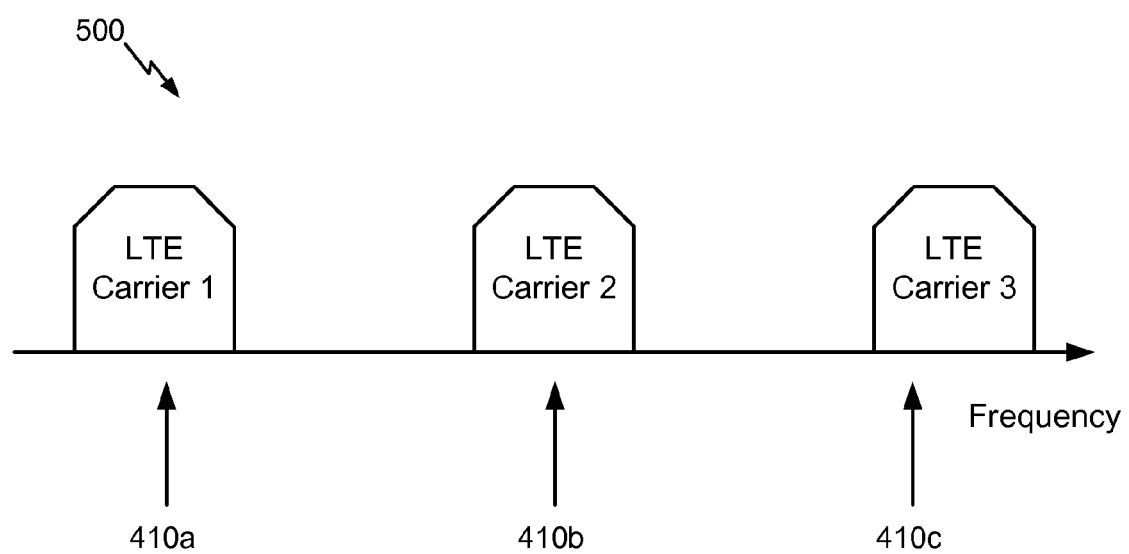
FIG. 5 illustrates non-continuous carrier aggregation, in accordance with certain aspects of the disclosure.

FIG. 5 illustrates non-continuous CA 500, in which multiple available component carriers 410 separated along the frequency band are aggregated.

Figure 6:
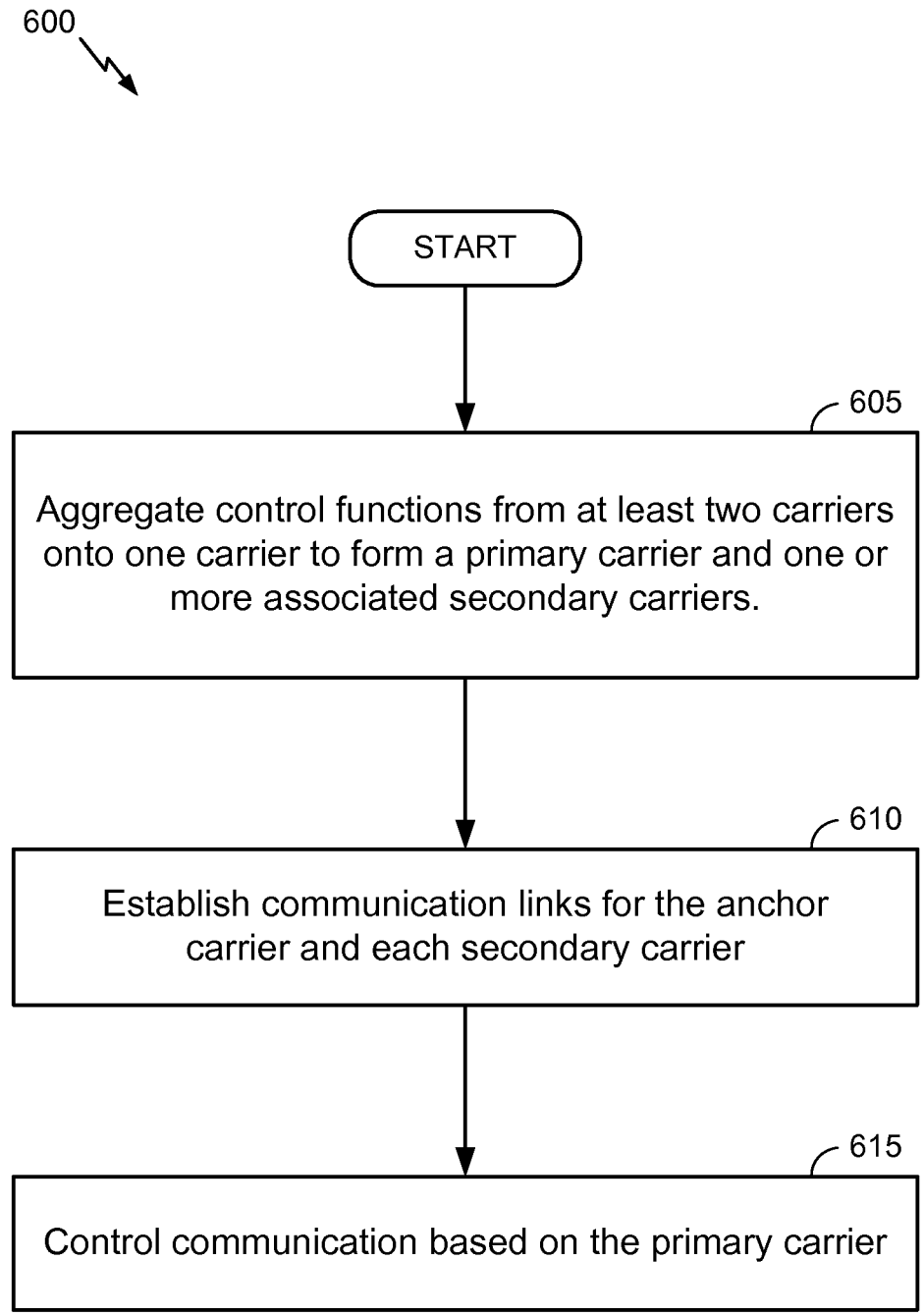
FIG. 6 illustrates example operations, in accordance with certain aspects of the disclosure.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. For example, all of the control functions for component carriers 410a, 410b, and 410c in FIG. 4 may be aggregated on component carrier 410a, which acts as the primary carrier for the aggregation of carriers 410a, 410b, and 410c. Next at block, 610, communication links are established for the primary carrier and each secondary carrier. For example, a UE associating with an eNodeB receives configuration information regarding the component carriers 410a, 410b, and 410c, and configuration information indicating mappings between control information to be received on primary carrier 410a and associated secondary carriers 410b and 410c. Then, communication is controlled based on the primary carrier in block 615. For example, an eNodeB may transmit a PDCCH to a UE on primary carrier 410a conveying a downlink grant to the UE for a PDSCH directed to the UE and transmitted by the eNodeB on secondary carrier 410b.

New Carrier Type

Previously, LTE-A standardization has required carriers to be backward-compatible, which enabled a smooth transition to new releases. However, this required the carriers to continuously transmit common reference signals (CRS, also referred to as cell-specific reference signals) in every subframe across the bandwidth. Most cell site energy consumption is caused by the power amplifier since the cell remains on even when only limited control signalling is being transmitted, causing the amplifier to continue to consume energy. A new carrier type (NCT) allows temporarily switching off of cells by removing transmission of CRS in four out of five sub frames. This reduces power consumed by the power amplifier. It also reduces the overhead and interference from CRS since the CRS won't be continuously transmitted in every subframe across the bandwidth. CRS were introduced in release 8 of LTE and are LTE's most basic downlink reference signal. They are transmitted in every resource block in the frequency domain and in every downlink subframe. CRS in a cell can be for one, two, or four corresponding antenna ports. CRS may be used by remote terminals to estimate channels for coherent demodulation. In addition, the new carrier type allows the downlink control channels to be operated using UE-specific Demodulation Reference Symbols. The New Carrier Type might be operated as a kind of extension carrier along with another LTE/LTE-A carrier or alternatively as a standalone non-backward compatible carrier.

Example PDSCH Transmission Schemes with Compact DCI Format in NCT in LTE

The control information sent on each PDCCH may convey one or more downlink grants, one or more uplink grants, power control information, and/or other information. In LTE Rel-8/9/10/11, each physical downlink control channel (PDCCH) follows a downlink control information (DCI) format. The different types of control information, both between the groups above as well as within the groups, correspond to different DCI message sizes. DCI is therefore categorized into different DCI formats. Downlink (DL) grant DCI formats may include formats 1, 1A, 1B, 1D, 2, 2A, 2B, 2C, and 2D. Uplink (UL) grant DCI formats may include formats 0 and 4. Broadcast/multicast DCI formats may include formats 1C, 3, and 3A.

In certain aspects, each DCI format contains a 16-bit CRC, which is masked by an identifier (ID) (e.g., a UE-specific ID or a broadcast/multicast ID). The size of the DCI may depend on system bandwidth, system type (FDD or TDD), number of common reference signal (CRS) antenna ports, DCI formats, whether carrier aggregation is being used, etc. The size of the DCI is typically tens of bits (e.g. 30~70) including CRC. A UE may determine that a DCI is intended for the UE by performing an unmasking operation utilizing the UE-specific ID (or a broadcast/multicast ID assigned to the UE, a paging indication ID, etc.) on the CRC, and determining if the DCI and unmasked CRC match (i.e., the unmasked CRC matches a CRC calculated from the DCI).

In addition, a UE may need to perform blind decodes to decode whether there are one or more PDCCHs addressed to it or not. A UE performs blind decoding on PDCCH candidates to determine which PDCCH candidates in a subframe are PDCCHs intended for the UE. The UE attempts blind decodes on PDCCH candidates from the common search space before attempting blind decodes on PDCCH candidates from the UE-specific search space. The size of a PDCCH can vary significantly; therefore, there may be a large number of PDCCH candidates in any given subframe. The number of blind decodes may be up to 44 in LTE Rel-8 and 9, and up to 60 in LTE Rel-10 when UL MIMO is configured.

The development of enhanced physical downlink control channels (EPDCCH) was motivated by multiple work items in Rel-11, including cooperative multi-point (CoMP), DL multiple-input multiple-output (MIMO) enhancements, further enhanced inter-cell interference coordination (ICIC), and New Carrier Type (NCT, which was later postponed to Rel-12). EPDCCH is frequency division multiplexing (FDM) based. Only demodulation reference signal (DM-RS) based EPDCCH is supported. Although the number of DM-RS REs for PDSCH are dependent on PDSCH ranks (e.g., 12 DM-RS REs for rank 1 and rank 2 PDSCH transmissions, and 24 DM-RS REs for rank 3 and above PDSCH transmissions in the normal cyclic prefix (CP) case), for simplicity, the design of EPDCCH always assumes maximum presence of DM-RS REs by assuming 24 DM-RS REs in the normal CP case (i.e., an eNodeB will not transmit an EPDCCH using REs that would be used for DM-RS when transmitting rank 3 and above PDSCH, even if the eNodeB is not transmitting rank 3 or higher PDSCH and the DM-RS REs will not be used). EPDCCH uses four possible antenna ports—107, 108, 109 and 110—corresponding to the ports used for DM-RS.

Two operation modes for EPDCCH are supported. The first mode is localized EPDCCH, in which a single precoder is applied for each physical resource block (PRB) pair. The second mode is distributed EPDCCH, in which two precoders cycle through the allocated resources within each PRB pair, where a PRB pair refers to two PRBs on the same subcarriers in the two slots of a single subframe. The physical resource block (PRB) represents the minimum allocation of symbols and subcarriers. In LTE, one subframe of 1 ms corresponds to two resource blocks. Each physical resource block in LTE is made up of 12 subcarriers for 7 symbols (when using the normal cyclic prefix) or 6 symbols (when using the extended cyclic prefix).

Each UE can be configured by the serving network with up to 2 EPDCCH resource sets, where each resource set is separately configured with 2, 4, or 8 PRB pairs. Each resource set is also separately configured with either localized or distributed mode. An EPDCCH search space is defined within each EPDCCH resource set. For example, UE1 may be configured by the serving network with EPDCCH resource set A, consisting of 2 PRB pairs and configured for localized mode, and resource set B, consisting of 4 PRB pairs and configured for distributed mode. UE2 may be configured with resource set C, configured for distributed mode, and resource set D, configured for localized mode, with each set consisting of 4 PRB pairs. Each of resource sets A, B, C, and D may have a different EPDCCH search space defined.

New Carrier Type (NCT) may be defined in LTE Rel-12. NCT may be supported in the context of carrier aggregation (CA) as one or more associated secondary carriers in a CA system. As discussed above, a NCT carrier used as an associated secondary carrier may not carry PBCH, PDCCH, EPDCCH, and may have a reduced number of CRS when compared to the primary carrier. Standalone (i.e., not aggregated with other carriers) NCT may also be supported in LTE Rel-12.

As discussed above, NCT has reduced CRS overhead, when compared to legacy carrier type (LCT). In NCT, CRS may be transmitted only once every 5 ms (vs. in every subframe in LCT), and using 1 port (vs. up to 4 CRS ports in LCT). In NCT, CRS may not be used for demodulation. CRS in NCT may be used for time/frequency tracking and/or reference signal received power (RSRP) measurement.

In legacy carrier type (LCT), CRS are transmitted in each subframe. Also in LCT, a UE is semi-statically configured (e.g., via RRC signaling) with a DL transmission mode. Transmission modes in LTE are described in 3GPP TS 36.213, entitled "Evolved Universal Terrestrial Radio Access (E-UTRA); Physical Layer Procedures," which is publicly available. Two DCI formats for DL grants are associated with each DL transmission mode. One DCI format is DCI format 1A (compact DCI format), and the other DCI format is DL mode dependent (e.g., DCI format 2D if DL transmission mode 10). Compact DCI format 1A is more DL control overhead efficient than other DCI formats, and may schedule rank 1 PDSCH transmissions. DCI format 1A typically schedules CRS based space frequency block code (SFBC) PDSCH transmissions.

In multimedia broadcast single frequency network (MB-SFN) subframes, where CRS is not present in the MBSFN region of the MBSFN subframes, UE-specific reference signal (UE-RS) based PDSCH transmissions may be scheduled by DCI format 1A, which is associated with a single antenna port (e.g., port 5 or port 7, depending on DL transmission mode).

According to certain aspects, PDSCH transmissions scheduled by a compact DCI format may be supported in NCT. For convenience, the compact DCI format is referred to herein as DCI format 1A' although such a DCI format may not be based on existing DCI format 1A. Use of a compact DCI format for DL scheduling will allow for reduced DL control overhead in NCT, compared to other DCI formats.

According to certain aspects, a compact DCI format for UL scheduling, referred to herein as DCI format 0' (instead of DCI format 0, which schedules rank 1 PUSCH transmissions in LCT), may be supported in NCT. Use of a compact DCI format for UL scheduling will allow for reduced DL control overhead in NCT, compared to other formats.

Note that in LCT, UE-RS based PDSCH transmissions scheduled by DCI format 1A can be used with closed loop beamforming (CLBF) (i.e., the cell receives explicit feedback from a UE regarding the channel state for particular beams) or open-loop beamforming (OLBF) (i.e., the cell does not receive explicit feedback from a UE regarding the channel state for particular beams). In the latter case (OLBF), beam cycling performed by cells in a network is done on a per PRB, per PRB pair, or per physical resource block group (PRG) basis. When the beam cycling is PRB (or PRB pair) based, the beam cycling uses a first beam in a first PRB (or PRB pair) and a second beam in a second PRB (or PRB pair), when both the first PRB (or PRB pair) and the second PRB (or PRB pair) are assigned to the PDSCH. If the UE is not configured with precoding matrix indicator (PMI) based channel state indicator (CSI) reporting (a form of explicit feedback regarding the channel state for particular beams), the beam cycling is PRB based if the resource allocation is based on distributed virtual resource block resource allocation based on antenna port 5, while the beam cycling is PRB pair based otherwise. In particular, when the PDSCH is based on antenna port 7, only PRB pair based beam cycling is possible. The beam cycling is PRG based if PMI based CSI feedback is configured on the UE. As a result, there is limited diversity gain, especially when PRG based beam cycling is enabled.

According to certain aspects, both closed loop beamforming and open loop beamforming based PDSCH transmissions scheduled by DCI format 1A' may be supported in NCT. For example, a cell configured to use a NCT carrier may perform OLBF using PRB based beam cycling when transmitting a PDSCH scheduled by DCI format 1A' to a UE which is not configured with PMI based CSI reporting, and CLBF when transmitting a PDSCH scheduled by DCI format 1A' to a UE which is configured with PMI based CSI reporting.

According to certain aspects, closed loop beamforming based PDCSH transmissions scheduled by DCI format 1A' may be based on 1 antenna port. For example, a cell configured to use a NCT carrier may transmit a PDSCH scheduled by DCI format 1A' based on antenna port 107.

According to certain aspects, open loop beamforming based PDCSH transmissions scheduled by DCI format 1A' may be based on 2 antenna ports or 1 antenna port. For example, a cell configured to use a NCT carrier may transmit a PDSCH scheduled by DCI format 1A' based on antenna ports 5, 7, or both.

According to certain aspects, 2 antenna port based open loop beamforming PDSCH allows beam cycling within a PRB pair. For example, a cell configured to use a NCT carrier may transmit a PDSCH scheduled by DCI format 1A' while performing PRB based beam cycling.

According to certain aspects, 1 antenna port based open loop beamforming PDSCH allows PRB level beam cycling even when a PRG is configured for a UE for some PDSCH transmissions, which is different from legacy operation. For example, a cell configured to use a NCT carrier may transmit a PDSCH scheduled by DCI format 1A' and spanning an entire PRG while performing PRB based beam cycling.

According to certain aspects, whether PRB (or PRB pair) level cycling or PRG level cycling (or more generally, beam cycling based on a first resource granularity or a second resource granularity) is selected can be related to the assignment size of a PDSCH. If the assignment size is below a threshold, a first resource granularity based (e.g., PRB pair based) beam cycling can be selected in order to allow better diversity at the expense of some channel estimation loss; otherwise, a second resource granularity based (e.g., PRG based) beam cycling is selected such that improved channel estimation is obtained while enjoying good diversity. For example, a cell configured to use a NCT carrier may transmit PDSCHs of one PRB pair or smaller and scheduled by DCI format 1A' using PRB based beam cycling, while transmitting PDSCHs larger than one PRB pair and scheduled by DCI format 1A' using PRG based beam cycling.

According to certain aspects, selection of a first resource granularity or a second resource granularity (e.g., PRB pair cycling or PRG cycling) may depend on the assignment type. For example, if the assignment is localized (physically contiguous), PRG level cycling may be selected, otherwise, if the assignment is frequency-distributed, then PRB (or PRB pair) based cycling may be selected. In particular, PRB level based beam cycling may be supported under distributed virtual resource block resource allocation for DCI format 1A' scheduled antenna port 7 based PDSCH transmissions, which is different from legacy operation where PRB level based beam cycling is not supported for DCI format 1A scheduled antenna port 7 based PDSCH transmissions.

According to certain aspects, CLBF may be selected when localized virtual resource blocks (LVRB) are used in the cell, while OLBF may be selected when distributed virtual resource blocks (DVRB) are used in the cell. For example, a cell configured to use a NCT carrier may transmit a PDSCH scheduled by DCI format 1A' on LVRB using CLBF to a first UE, while transmitting a PDSCH scheduled by DCI format 1A' on DVRB using OLBF to a second UE.

According to certain aspects, the use of a broadcast or unicast PDSCH does not vary the capability to support CLBF and OLBF when the PDSCH is scheduled by a DCI format 1A'. In addition, both broadcast and unicast PDSCH may use PRB (or PRB pair) based and PRG based beam cycling.

According to certain aspects, selection of PRB (or PRB pair) based or PRG based beam cycling may be based on whether the PDSCH is broadcast or unicast. For example, if the PDSCH is broadcast, then PRB (or PRB pair) based beam cycling may be selected.

According to certain aspects, unicast PDSCH may support CLBF and OLBF regardless of whether the control channel comes from UE-specific search space or common search space (CSS). For example, a cell configured to use a NCT carrier may transmit an EPDCCH in a UE-specific search space scheduling a PDSCH transmitted using OLBF.

According to certain aspects, the search space selected for the PDSCH may also determine the type of beam cycling to be used, for example, if the PDSCH comes from the common search space, then PRB (or PRB pair) based beam cycling may always be selected.

According to certain aspects, both 1-port and 2-port based OLBF may be supported, and the cell may switch between the two either semi-statically or dynamically. For example, a cell configured to use a NCT carrier may semi-statically configure (e.g., using RRC signaling) served UEs to receive 2-port based OLBF PDSCHs.

According to certain aspects, whether the PDSCH transmission associated with DCI format 1A' is CLBF or OLBF may be transparent to the UE. For example, a UE may transmit PMI based CSI to a cell in response to a PDSCH that the cell transmitted using OLBF.

According to certain aspects, whether the PDSCH transmission associated with DCI format 1A' uses CLBF or OLBF may be non-transparent to the UE. For example, if OLBF is based on 2 antenna ports, the type of beamforming is indicated to the UE by whether the PDSCH is based on 1 antenna port (CLBF) or 2 antenna ports (OLBF). Such indication can be explicit, for example, one bit may be carried in DCI format 1A' to indicate the selected type of beamforming used in the PDSCH.

According to certain aspects, whether the PDSCH transmission associated with DCI format 1A' is CLBF or OBLF may be indicated to the UE implicitly. For example, if the resource allocation used by the cell is localized, the corresponding PDSCH is based on 1 antenna port or CLBF, while if the resource allocation used by the cell is distributed, the corresponding PDSCH is based on 2 antenna ports or OLBF.

According to certain aspects, whether the PDSCH transmission associated with DCI format 1A' is CLBF or OBLF may be indicated to the UE implicitly based on starting CCEs, EPDCCH resource set, EPDCCH decoding candidate, subframe indices, etc. For example, an EPDCCH transmitted using a first resource set may schedule a PDSCH in a set of PRBs to be transmitted using CLBF, however a similar EPDCCH transmitted using a second resource set would have scheduled a PDSCH in the same set of PRBs to be transmitted using OLBF.

According to certain aspects, the indication of whether the PDSCH transmission associated with DCI format 1A' is CLBF or OBLF may be semi-static (e.g., indicated by RRC configuration) or dynamic (e.g., indicated by a control channel). For example, a cell may set a bit to zero or one in each EPDCCH to indicate CLBF or OLBF, respectively.

According to certain aspects, the indication of whether the PDSCH transmission associated with DCI format 1A' is CLBF or OBLF may be limited for a certain traffic type (e.g., to unicast, not to broadcast). For example, a cell may semi-statically configure served UEs that unicast PDSCH scheduled by DCI format 1A' will be transmitted with CLBF, while broadcast PDSCH will be transmitted with OLBF.

According to certain aspects, the indication of whether the PDSCH transmission associated with DCI format 1A' is CLBF or OBLF may be limited to a certain search space (e.g., to control channels from the UE-specific search space, but not to those from the common search space). For example, a UE may be configured to treat EPDCCHs received from the UE-specific search space as scheduling PDSCHs being transmitted with CLBF, while EPDCCHs received from the common specific search space are treated as scheduling PDSCHs being transmitted with OLBF.

In LCT, PRG based beam cycling (where beams are cycled for each PRG) may be enabled on a per UE basis. According to certain aspects, PRG based beam cycling may be enabled on a per cell basis (e.g., using a broadcast).

According to certain aspects, PRG based beam cycling may always be enabled while using NCT. For example, UEs and cells supporting NCT may be programmed to transmit/receive on a NCT carrier using PRG based beam cycling.

According to certain aspects, MU-MIMO PDSCH scheduled by DCI format 1A' may be supported. For example, a cell operating on a NCT carrier may use DCI format 1A' to schedule multiple PDSCHs on multiple layers to multiple UEs (i.e., MU-MIMO).

According to certain aspects, MU-MIMO PDSCH operations scheduled by DCI format 1A' are similar to MIMO DCI formats (e.g., DCI format 2D) scheduled MU-MIMO operations, but MU-MIMO PDSCH operations scheduled by DCI format 1A' may be restricted to rank 1 transmissions and compact resource allocation.

According to certain aspects, MU-MIMO PDSCH operations scheduled by DCI format 1A' may be limited to only antenna ports 7 and 8, and 12 DM-RS REs, instead of 24 DM-RS REs that are possible if antenna ports 9 and 10 are also allowed for DCI format 1A's scheduled PDSCH operations. Allowing ports 9 and 10 with DCI format 1A' may enable up to 4-layer orthogonal MU-MIMO transmissions.

According to certain aspects, non-orthogonal DM-RS using a 1-bit scrambling ID in DCI format 1A' may be enabled. For example, a cell may schedule two UEs to receive PDSCH in the same PRBs based on non-orthogonal DM-RS, with a different scrambling ID for each UE (i.e., the 1-bit scrambling ID is 0 for the first UE, and 1 for the second UE) and transmit a PDSCH to each UE, with each UE using descrambling based on their scrambling IDs to decode their own PDSCH. Non-orthogonal DM-RS using 1-bit scrambling ID in DCI format 1A' may only support up to two-layer MU-MIMO.

According to certain aspects, the 1-bit scrambling ID defined in LCT MIMO DCI formats (e.g., the one in DCI format 2D) may be disabled in order to have a fixed scrambling ID (e.g., 0).

According to certain aspects, non-orthogonal DM-RS is supported in NCT to enable more MU-MIMO flexibility, and non-orthogonal MU-MIMO is enabled by using a UE-specific virtual cell ID, where the virtual cell ID for a UE may be determined based on a RRC configuration. For example, a cell may configure some or all of the cell's served UEs with virtual cell IDs (via, e.g., RRC configuration) and transmit using a particular virtual cell ID when the cell determines to transmit PDSCH based on non-orthogonal DM-RS.

FIG. 7 illustrates an exemplary DCI format 1A' 700, in accordance with certain aspects of the disclosure. Column 702 lists the fields for the DCI format 1A'. Included in column 702 are two new (i.e., not included in LCT DCI formats) fields, a PDSCH transmission scheme field 720 indicating OLBF or CLBF, and a PDSCH antenna port field 722 indicating either port 7 or port 8. As discussed above, the PDSCH transmission scheme indicator is optional, and not necessary if the PDSCH scheme is determined implicitly. Columns 704 list bit-widths for each field of the exemplary DCI format 1A', according to the number of carriers assigned. Column 706 lists notes for each field of the exemplary DCI format 1A'.

Row 724 shows the total number of bits required for the new DCI format 1A'. As shown in FIG. 7, the proposed DCI format 1A' requires 40 to 48 bits.

According to certain aspects, EPDCCH transmission port and/or mode may be linked with PDSCH transmission port and/or mode, such that there is no explicit indication of PDSCH antenna port and/or PDSCH beamforming (CLBF vs. OLBF) via DCI format 1A'. These aspects have some DCI overhead savings, at the expense of reduced eNB scheduling flexibility. However, it is desirable to limit DCI format 1A' scheduled PDSCH transmissions to a subset of maximum presence of DM-RS REs because of the reduced overhead, e.g., 12 DM-RS REs for PDSCH instead of 24 DM-RS REs in the normal cyclic prefix case. As a result, the mapping from EPDCCH ports (which assumes maximum presence of DM-REs, e.g., 24 DM-RS REs in the normal cyclic prefix case) to PDSCH ports may take into account a subset of maximum presence of DM-RS REs (e.g., 12 DM-RS REs in the normal cyclic prefix case) for PDSCH.

FIG. 8 illustrates a mapping 800 linking EPDCCH transmission port and/or mode with PDSCH transmission port and/or mode in an exemplary DCI format 1A', in accordance with certain aspects of the disclosure. This mapping assumes a one-to-one mapping between EPDCCH mode and PDSCH mode, and two ports for OLBF PDSCH. Column 802 lists the modes (localized, i.e. LVRB, and distributed, i.e. DVRB) for EPDCCH. Column 804 lists the transmission ports used for transmitting EPDCCH conveying a DCI format 1A', and column 806 lists the transmission ports used for transmitting the granted PDSCH. Column 808 lists the beamforming modes used according to the exemplary mapping.

According to certain aspects, there may not be a one-to-one mapping between EPDCCH mode and PDSCH mode. For example, distributed EDPCCH 1A' may be associated with CLBF PDSCH or OLBF PDSCH, while a localized EPDCCH 1A' may be associated with a CLBF PDSCH (and possibly OLBF PDSCH as well).

According to certain aspects, DCI format 0' and DCI format 1A' are matched in size. Due to addition of some bits in DCI format 1A' when compared to LCT DCI format 1A, additional (compared to LCT DCI format 0) zero-padding may be necessary for DCI format 0' to match it in size with DCI format 1A'. However, instead of zero-padding, the additional bits in DCI format 0' may be used for other purposes, at least for some UEs. For example, to enable CLBF for rank 1 PUSCH via DCI format 0', a rank 1 precoding indicator bit may be included in DCI format 0' transmitted to UL MIMO capable UEs, while the corresponding bits transmitted to UL MIMO non-capable UEs (e.g. UEs not capable of communicating on NCT), may contain zero-padding.

A UE configured to transmit using 2 UL TX antenna ports on a LCT carrier, may report 1 of 6 rank 1 PMI values; while a UE configured to use 4 UL TX antenna ports on a LCT carrier, may report 1 of 24 rank 1 PMI values. According to certain aspects, the PMI size in DCI format 0' is set such that the number of PMI values is generally aligned with (or fewer than) the number of new bits in DCI format 1A'. The bitwidth for PMI in DCI format 0' may be independent of the number of UL transmit (TX) antenna ports. For instance, if DCI format 1A' has a 2-bit ACK resource offset (ARO), a 1-bit beamforming (BF) indicator, and a 1-bit PDSCH antenna port indicator, a total of 4 new bits are added when compared to LCT DCI format 1A, and up to 16 PMI values may be chosen for DCI format 0' (not 6 or 24).

According to certain aspects, the contents and/or size of DCI format 1A' may be different in a common search space (CSS) than in a UE-specific search space (USS). According to certain aspects, for USS, the DCI format is referred to 1A', while for CSS, the DCI format is referred to as 1A".

According to certain aspects, some information fields may only be present in USS (i.e., DCI format 1A'). For example, the beamforming indicator field may not be present in 1A" (transmitted in CSS), if transmitting a DCI in CSS implicitly configures a PDSCH to be transmitted using OLBF.

According to certain aspects, cell radio network temporary identifier (C-RNTI) based DCI formats may be allowed in CSS on a NCT carrier, but the DCI content/size of those formats is aligned with those defined for broadcast, such as paging radio network temporary identifier (P-RNTI), system information radio network temporary identifier (SI-RNTI), random access radio network temporary identifier (RA-RNTI), etc. based DCI formats. For example, a C-RNTI based DCI format 1 transmitted in CSS on a NCT carrier is aligned with the content and size of DCI formats defined for broadcast.

According to certain aspects, EPDCCH and PDSCH transmitted using DVRB may be supported for broadcast traffic on a NCT carrier. PDSCH using DVRB may be transmitted with PRB based or PRB pair based beam cycling. In the former case, PRB based distributed PDSCH may have frequency-distributed PDSCH assignments with PRB as a resource granularity (i.e., the PDSCH is transmitted using PRB based beam cycling). In the latter case, PRB pair based distributed PDSCH may have frequency-distributed PDSCH assignments with PRB pair as a resource granularity (i.e., the PDSCH is transmitted using PRB pair based beam cycling).

According to certain aspects, unicast PDSCH with control from CSS is supported. Unicast PDSCH with control from CSS transmitted on a NCT carrier may be transmitted using DVRB. The unicast PDSCH may be transmitted with PRB based or PRB pair based beam cycling. In the former case, PRB based distributed PDSCH may have frequency-distributed PDSCH assignments with PRB as a resource granularity. In the latter case, PRB pair based distributed PDSCH may have frequency-distributed PDSCH assignments with PRB pair as a resource granularity.

According to certain aspects, interpretation of some information bits may depend on the PDSCH transmission mode (OLBF vs. CLBF) indicated by DCI format 1A'. For example, if CLBF is used, 1 bit may indicate an antenna port used in transmitting the PDSCH; however, if OLBF is used, the same bit may be a reserved bit or set to '0'.

According to certain aspects, the DCI contents/size may be different for distributed EPDCCH and localized EPDCCH, especially when there is a mapping of EPDCCH mode to PDSCH mode. For example, distributed EPDCCH DCI format 1A' may not have an antenna port indicator, which may be different from the localized EPDCCH 1A' case.

According to certain aspects, DCI format 0' may have two permitted sizes. DCI format 0' may have a first size corresponding to the size of DCI format 1A' used with distributed EPDCCH and a second size corresponding to the size of DCI format 1A' used with localized EPDCCH.

According to certain aspects, DCI sizes may depend on the EPDCCH resource set in use. This is supportable because each EPDCCH mode (localized or distributed) may be associated with one respective EPDCCH resource set per UE. For example, a UE may be configured with two EPDCCH resource sets A and B, with set A used for EPDCCHs using LVRB and set B used for EPDCCHs using DVRB. A cell may transmit an EPDCCH scheduling a LVRB PDSCH using the DCI format 1A' sized for LVRB, and the receiving UE will decode the DCI format 1A' as being transmitted with LVRB, based on receiving the EPDCCH in resource set A.

According to certain aspects, different DM-RS REs may be assigned for use with OLBF vs. CLBF. For example, a cell operating on a NCT carrier may transmit 12 DM-RS on one set of REs when the cell transmits using OLBF, and transmit 12 DM-RS on a second set of REs (or, e.g., 24 DM-REs) when the cell transmits using CLBF.

According to certain aspects, the network may dynamically or semi-statically indicate to the UE whether 12 or 24 DM-RS REs are used for a DCI format 1A' scheduled PDSCH. For example, a cell may semi-statically configure (e.g., via RRC signaling) the cell's served UEs with information that the cell will transmit 12 DM-RS on a particular set of REs when the cell schedules PDSCH using DCI format 1A'.

Figure 9:
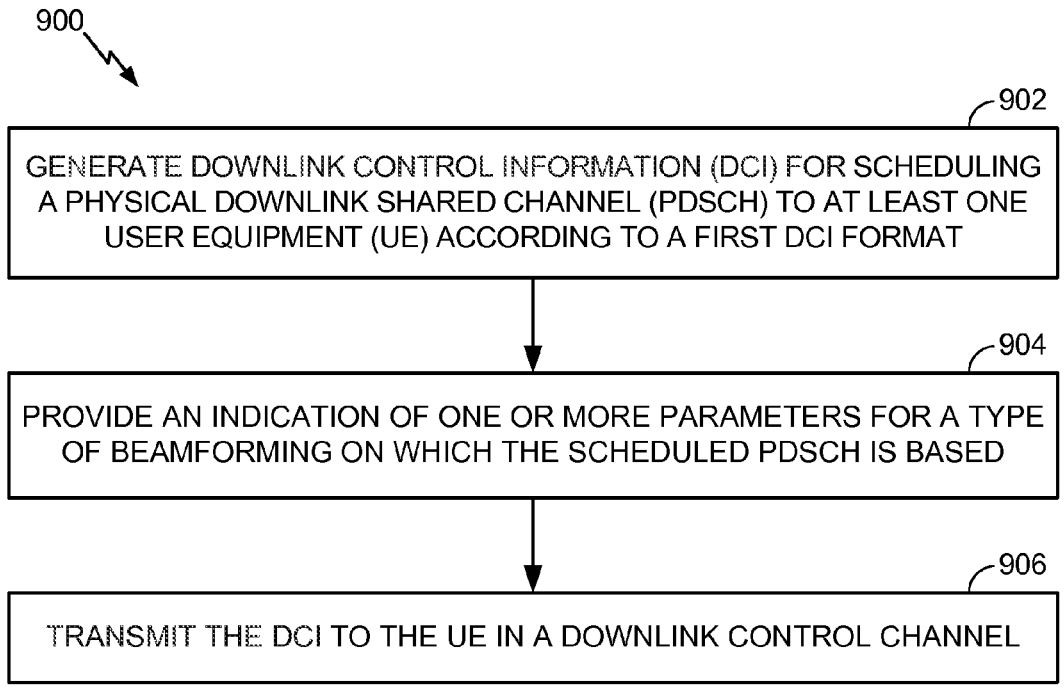
FIG. 9 illustrates example operations, which may be performed at a base station (BS), in accordance with certain aspects of the disclosure.

FIG. 9 illustrates example operations 900, which may be performed by a base station (BS), for sending downlink control information to a UE, in accordance with certain aspects of the disclosure. Operations 900 may begin, at 902, by generating Downlink Control Information (DCI) for scheduling a physical downlink shared channel (PDSCH) to at least one user equipment (UE) according to a first DCI format. For example, a BS 110a shown in FIG. 1 may generate a DCI format 1A' scheduling a PDSCH to be transmitted to a UE 120. At 904, the BS may provide an indication of one or more parameters for a type of beamforming on which the scheduled PDSCH is based. For example, the BS may set a bit in the generated DCI format 1A' indicating that the PDSCH will be transmitted using PRB based OLBF. At 906, the BS may transmit the DCI to the UE in a physical downlink control channel (PDCCH). For example, the BS may transmit the generated DCI format 1A' to the UE in an EPDCCH.

Figure 10:
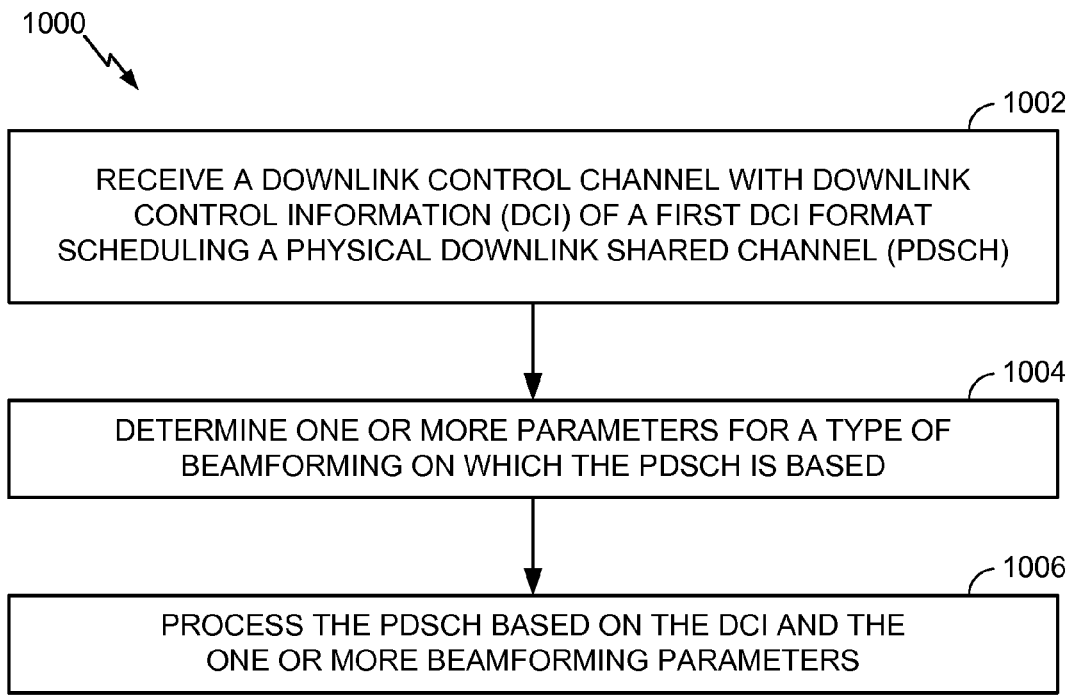
FIG. 10 illustrates example operations, which may be performed at a user equipment (UE), in accordance with certain aspects of the disclosure.

FIG. 10 illustrates example operations 1000, which may be performed by a user equipment (UE), in accordance with certain aspects of the disclosure. The operations 1000 may be performed by a UE receiving transmissions from the BS in operations 900, and may be considered complementary to the operations 900. Operations 1000 may begin, at 1002, by receiving a downlink control channel scheduling a physical downlink shared channel (PDSCH) to at least one user equipment (UE) according to a first DCI format. For example, a UE 120 may receive an EPDCCH conveying a DCI format 1A' scheduling a PDSCH from a BS 110a. At 1004, the UE may determine a type of beamforming on which the scheduled PDSCH is based from an indicator provided by the downlink control channel. For example, the UE may detect that a bit in the DCI format 1A' is set to 1 and determine that the DCI format 1A' is scheduling a PDSCH to be transmitted using PRB based OLBF. At 1006, the UE may process (e.g., receive and decode) the PDSCH using the determined type of beamforming. For example, the UE may receive and decode the PDSCH scheduled by the DCI format 1A' using PRB based OLBF.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or various combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station, comprising:
   generating Downlink Control Information (DCI) for scheduling a physical downlink shared channel (PDSCH) to at least one user equipment (UE) according to a first DCI format, where the first DCI format schedules one PDSCH codeword;
   providing an indication to the UE of one or more parameters for a type of beamforming on which the scheduled PDSCH is based, wherein the indication comprises an indication of whether the PDSCH is based on open loop beamforming (OLBF) or closed loop beamforming (CLBF); and
   transmitting the DCI to the UE in a downlink control channel.

2. The method of claim 1, wherein the PDSCH is scheduled for transmission on a new carrier type (NCT) different than a legacy carrier type (LCT), wherein the UE is a UE type capable of communicating on the NCT while other UE types are not capable of communicating on the NCT.

3. The method of claim 1, wherein the downlink control channel comprises an enhanced physical downlink control channel (EPDCCH).

4. The method of claim 1, wherein the indication comprises an indication of at least one of: how many or which antenna ports are used for the beamforming.

5. The method of claim 1, wherein:
   the PDSCH is based on OLBF; and
   a beam cycling resource granularity for the OLBF is based, at least in part, on resources assigned to the PDSCH.

6. The method of claim 1, wherein:
   the PDSCH is based on OLBF; and
   a beam cycling resource granularity for the OLBF is based, at least in part, on a type of search space of a control channel in which the DCI is transmitted.

7. The method of claim 1, wherein:
   the PDSCH is based on OLBF; and
   a beam cycling resource granularity for the OLBF, under certain conditions, is less than a physical resource block (PRB) pair.

8. The method of claim 1, wherein an indication of at least one beamforming parameter is signaled semi-statically or dynamically.

9. The method of claim 1, wherein the scheduled PDSCH comprises a multi-user multiple-input multiple-output (MU-MIMO) PDSCH.

10. The method of claim 1, wherein the indication is provided via at least one of a transmission port or transmission mode of the downlink control channel in which the DCI is transmitted.

11. The method of claim 1, wherein a size of the first DCI format is dependent, at least in part, on a type of search space in which the downlink control channel is transmitted.

12. A method for wireless communications by a user equipment (UE), comprising:
   receiving a downlink control channel with Downlink Control Information (DCI) of a first DCI format for scheduling a physical downlink shared channel (PDSCH);
   determining one or more parameters for a type of beamforming on which the PDSCH is based, wherein the determination is based on an indication of whether the PDSCH is based on open loop beamforming (OLBF) or closed loop beamforming (CLBF); and
   processing the PDSCH based on the DCI and the one or more beamforming parameters.

13. The method of claim 12, wherein the PDSCH is scheduled for transmission on a new carrier type (NCT) different than a legacy carrier type (LCT), wherein the UE is a UE type capable of communicating on the NCT while other UE types are not capable of communicating on the NCT.

14. The method of claim 12, wherein the downlink control channel comprises an enhanced physical downlink control channel (EPDCCH).

15. The method of claim 12, wherein the determination is based on or more fields in the first DCI format.

16. The method of claim 12, wherein the determination is based on an indication of at least one of: how many or which antenna ports are used for the beamforming.

17. The method of claim 12, wherein:
   the PDSCH is based on OLBF; and
   a beam cycling resource granularity for the OLBF is based, at least in part, on resources assigned to the PDSCH.

18. The method of claim 17, wherein:

the beam cycling resource granularity for the OLBF is further based on at least one of: a size of resources assigned to the PDSCH, whether resources assigned to the PDSCH are localized or distributed, or whether the PDSCH is broadcast or unicast.

19. The method of claim 18, wherein:

a resource granularity of a physical resource block (PRB) or smaller is used if the size of resources assigned to the PDSCH is less than or equal to a first size; and a resource granularity of at least a physical resource block group (PRG) is used if the size of resources assigned to the PDSCH is greater than the first size.

20. The method of claim 12, wherein:

the PDSCH is based on OLBF; and a beam cycling resource granularity for the OLBF is based, at least in part, on a type of search space of a control channel in which the DCI is transmitted.

21. The method of claim 12, wherein:

the PDSCH is based on OLBF; and a beam cycling resource granularity for the OLBF, under certain conditions, is less than a physical resource block (PRB) pair.

22. The method of claim 12, wherein the determination is based on an indication of at least one beamforming parameter that is signaled semi-statically or dynamically.

23. The method of claim 12, wherein the scheduled PDSCH comprises a multi-user multiple-input multiple-output (MU-MIMO) PDSCH.

24. The method of claim 12, wherein the determination is based on at least one of a transmission port or transmission mode of the downlink control channel in which the DCI is transmitted.

25. The method of claim 24, wherein the determination is based on a mapping of the downlink control channel ports to PDSCH ports.

26. The method of claim 12, wherein a size of the first DCI format is dependent, at least in part, on a type of search space in which the downlink control channel is transmitted.

27. An apparatus for wireless communications by a user equipment (UE), comprising:

at least one processor configured to receive a downlink control channel with Downlink Control Information (DCI) of a first DCI format for scheduling a physical downlink shared channel (PDSCH), determine one or more parameters for a type of beamforming on which the PDSCH is based, wherein the determination is based on an indication of whether the PDSCH is based on open loop beamforming (OLBF) or closed loop beamforming (CLBF), and process the PDSCH based on the DCI and the one or more beamforming parameters; and a memory coupled with the at least one processor.

28. A non-transitory computer readable medium for wireless communications by a user equipment (UE), the non-transitory computer readable medium having instructions stored thereon for:

receiving a downlink control channel with Downlink Control Information (DCI) of a first DCI format for scheduling a physical downlink shared channel (PDSCH);

determining one or more parameters for a type of beamforming on which the PDSCH is based, wherein the determination is based on an indication of whether the PDSCH is based on open loop beamforming (OLBF) or closed loop beamforming (CLBF); and processing the PDSCH based on the DCI and the one or more beamforming parameters.

\* \* \* \* \*